Oct. 13, 1942.     R. W. WENGEL     2,298,322
SLIDE CHANGING DEVICE
Filed May 3, 1940     2 Sheets-Sheet 1
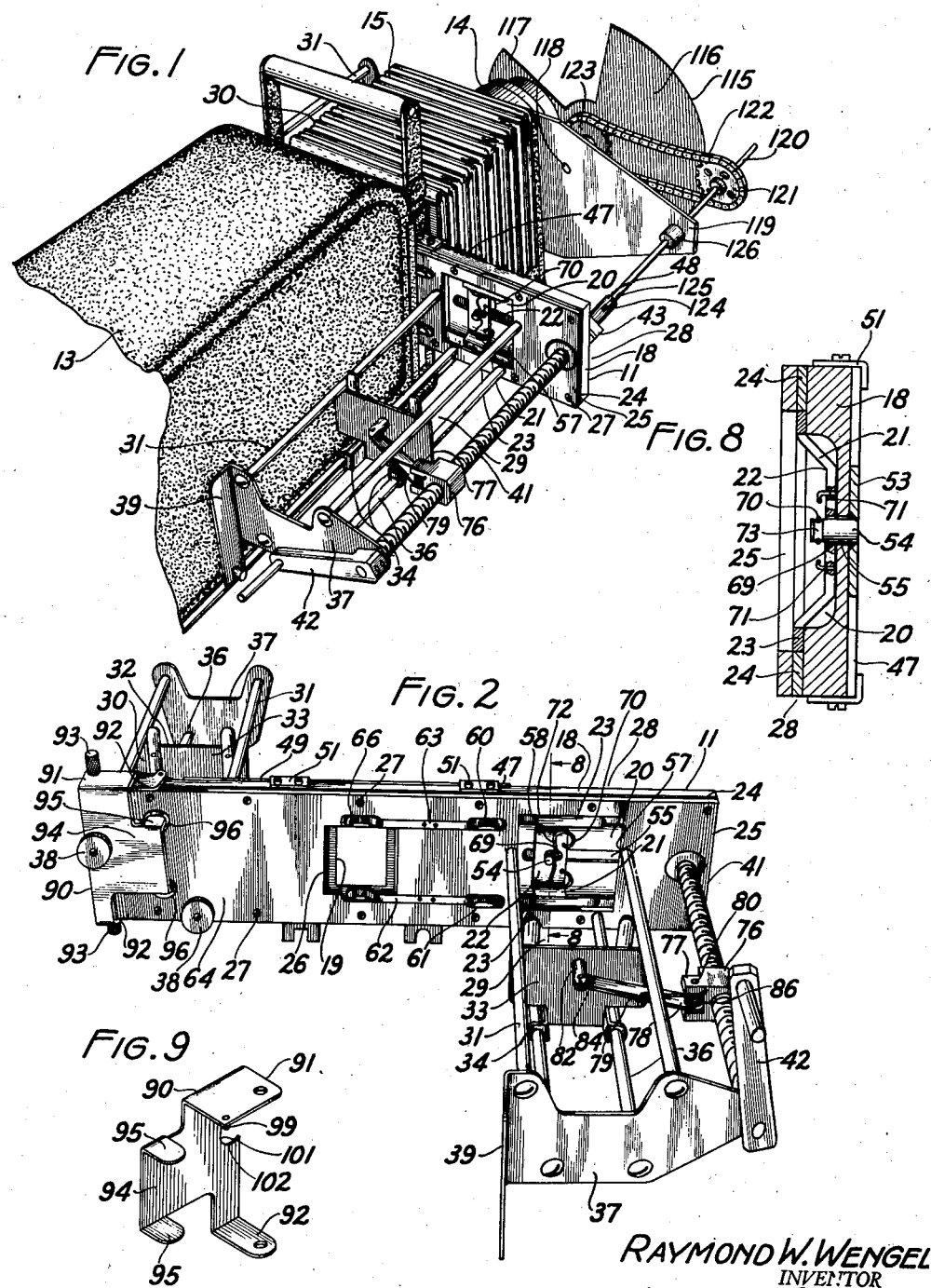
RAYMOND W. WENGEL
INVENTOR
ATTORNEYS Oct. 13, 1942.     R. W. WENGEL     2,298,322
SLIDE CHANGING DEVICE
Filed May 3, 1940     2 Sheets-Sheet 2

RAYMOND W. WENGEL
INVENTOR
BY
ATTORNEYS

Patented Oct. 13, 1942

2,298,322

UNITED STATES PATENT OFFICE 2,298,322

SLIDE CHANGING DEVICE

Raymond W. Wengel, Rochester, N. Y., assignor to Eastman Kodak Company, Rochester, N. Y., a corporation of New Jersey Application May 3, 1940, Serial No. 333,180

19 Claims. (Cl. 88—28)

The present invention relates to projectors, and more particularly to a slide changing device by which transparency slides may be moved into and out of projecting position.

One object of the invention is the provision of a device of this kind of a slide changer which will move one slide out of projecting position and simultaneously move another slide into such position.

A further object of the invention is the provision of a flexible connection between the slide changer and its actuating means so that the changer may adjust itself relative to the mounting plate to compensate for variations in the overall length of the group of slides mounted on the plate.

Still another object of the invention is the provision of an arrangement for operatively connecting the slide follower of the supply magazine to the slide changer actuating means so that the follower will exert a constant and uniform pressure on the stack of slides in the supply magazine to move the slides into position to be engaged by the slide changer.

A still further object of the invention is the provision of an ejector for ejecting the slides at the discharge end of the mounting plates into the takeup magazine, and to positively retain such slides in ejecting position.

Yet another object of the invention is the provision of an ejector control means for operating the ejector in timed relation to the movement of the slide changer.

Another object of the invention is the provision of a rotary shutter which is operated in proper timed sequence to the actuation of the slide changer and the ejection of the slides.

Yet another object of the invention is the provision of a slide changing device which is positive in its action, easy to operate, and highly effective in use.

To these and other ends, the invention resides in certain improvements and combinations of parts, all as will be hereinafter more fully described, the novel features being pointed out in the claims at the end of the specification.

In the drawings:

Fig. 1 is a perspective view of a projector, showing the relation thereto of a slide changing device constructed in accordance with the preferred embodiment of the present invention;

Fig. 2 is a rear perspective view of the slide changing device detached from the projector, showing the arrangement and relation of the various parts thereof;

Fig. 8 is a vertical sectional view taken substantially on line 8—8 of Fig. 2, showing the slide changer and the means for resiliently mounting the changer so that it may adjust itself to compensate for the slight variations in the size of the slides;

Fig. 9 is a perspective view of the slide ejector plate removed from the device.

Similar reference numerals throughout the various views indicate the same parts.

Figure 3:
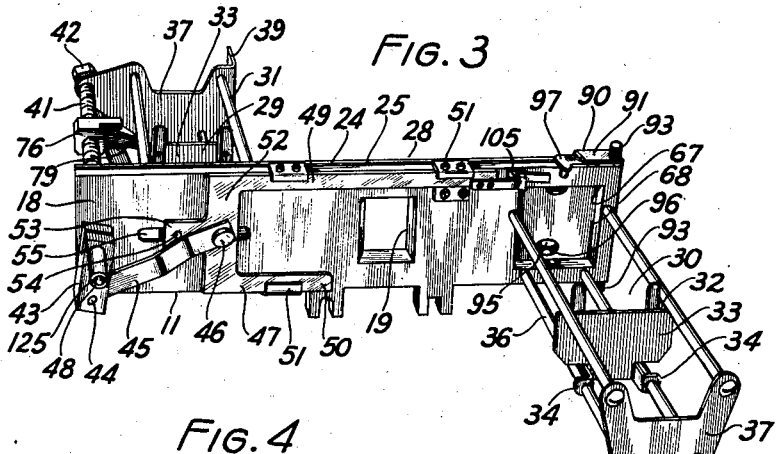
Fig. 3 is a front perspective view of the device illustrated in Fig. 2, showing the slide changer actuating mechanism, and the ejector control member.

The present invention is embodied in a slide changing device, generally indicated by the numeral 11, arranged to move transparency slides, broadly designated at 12, into and out of projecting position. The device 11 is shown, in the present instance, mounted on a projector formed with a body portion 13 which houses the lamp and condenser lenses, not shown, and provided with a projecting lens 14 which is connected to the body portion 13 by an expansible bellows 15. The specific form of projector shown is for purposes of illustration only and does not constitute a part of the present invention. Obviously other well-known types of projectors may be used. The slide changing device 11 is preferably detachably mounted on the projector so that it may be quickly and easily secured thereto or detached therefrom. As various means for detachably mounting the device on the projector will readily suggest themselves to those in the art, a detailed showing is not, therefore, deemed necessary to a full understanding of the present invention.

The preferred form of slide-changing device comprises a plate 18 formed with a suitable aperture 19 which is arranged to be positioned in alignment with the optical axis of the projector when the device is mounted thereon, as shown in Fig. 1. The plate 18 is formed with a longitudinally extending recess 20 in which is positioned the intermediate offset portion 21 of a slide changer, generally indicated by the numeral 22, and of the shape best shown in Fig. 8. The opposite side edges of the changer 22 are formed to provide guide members or runners 23 which slide along guide rails 24 positioned between the plate 18 and a rear cover plate 25. The latter is formed with an aperture 26 which is in alignment with and preferably slightly larger than the aperture 19 of the plate 18, see Fig. 2. The plates 18 and 25 and the guide rails 24 are held in assembled relation by screws 27, or other suitable fastening means, and thus constitute a unitary structure which may be broadly considered as a single apertured mounting plate, broadly designated by the numeral 28, to the opposite ends of which are secured the slide supply and slide takeup magazines 29 and 30 respectively.

Figure 7:
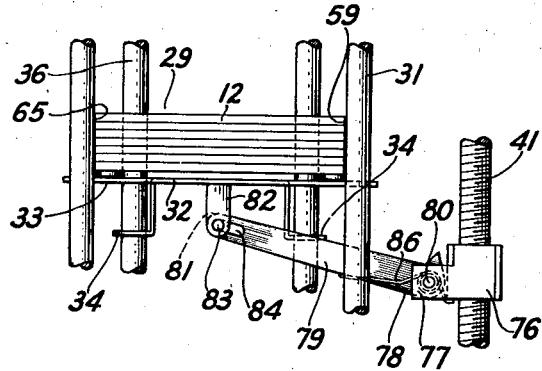
Fig. 7 is a fragmentary plan view of a portion of the device illustrated in Figs. 2 and 3, but on a larger scale, showing the supply magazine and the slide follower thereof, and the means for operatively connecting the follower to the slide-changer actuating means and for providing a uniform pressure on the follower.

As both magazines are substantially identical in structure, only one will be described in detail, the corresponding parts of the other magazine being designated by the same numerals. Any slight structural differences between the two magazines will be later pointed out. Each slide magazine is formed from a pair upper spaced rods 31 which are positioned to slidably engage the upper edge 32 of a slide follower 33 of the shape best shown in Fig. 2. The lower portion of the follower is formed with a pair of ears 34 having openings through which a lower pair of rods 36 extend and along which the follower slides. The rods 31 and 36 thus cooperate to form the support for the slides 12, as best shown in Fig. 7, and provide a guide for the follower, as will be readily apparent from an inspection of Figs. 1, 2, 3 and 7. The rods 31 and 36 are connected at one end to a plate 37 which retains the rods in proper spaced relation. The other ends of the rods slidably extend into registered openings, not shown, formed on the mounting plate 28. The rods 31 and 36 of the supply magazine 29 extend into registering apertures, not shown, in the rear cover plate 25, and are held therein by any suitable means, such, for example, as welding or soldering, to retain the magazine in position. In the take-up magazine 30, on the other hand, one upper rod 31 and the diagonally opposite lower rod 36 extend through the plates 18 and 25 and the guide rails 24, and are threaded to receive thumbscrews 38, as shown in Fig. 2, to detachably secure the magazine 30 to the mounting plate. The end plate 27 of the supply magazine is, in the present embodiment, formed with a flange 39 which is arranged to engage the side of the projector body 13, see Fig. 1, so as to eliminate any tilting or cocking of the device on the projector, the advantages of which will be readily apparent to those in the art. If desired, the flange 39 may be detachably secured to the projector 13 by screws or other suitable fastening means.

A threaded rod 41 has the opposite ends thereof rotatably positioned in the mounting plate 28 and the end plate 37 of the supply magazine 29, as illustrated in Figs. 1, 2, and 3. One end of the rod has secured thereto a handle 42 by which the rod may be rotated, while the other end, adjacent the plate 28, has secured thereto a crank 43 to the free end of which is pivoted at 44 one end of the lever 45 the other end of which is pivotally connected to a stud 46 carried by a U-shaped member, broadly indicated by the numeral 47. The crank 43 is held in place against the plate 28 by a slotted sleeve 48, the purpose of which will be later hereinafter more fully described. The member 47 is formed with a long upper arm 49 and a shorter lower arm 50 which are slidably mounted in clips or brackets 51 secured to the front plate 18, as best shown in Fig. 3. The arms 49 and 50 are connected by a cross member or tie 52 formed with a shank 53 to which is secured a pin 54 arranged to extend through a registering slot 55 formed in the plate 18, and connected to the slide changer 22 in a manner to be later described. It is thus apparent that upon rotation of the rod 41, the member 47 will be reciprocated back and forth on the plate 18. Such movement of the member 47 will similarly move the slide changer 22 substantially as a unit therewith along the guide rails 24 to move the slides 12 into and out of projecting position.

The slides 12 in the supply magazine 29 are fed or moved forward as a unit by the follower 33 thereof, in a manner to be later described, to move the foremost slide through a registering aperture 57 of the plate 25 and into the path of the slide changer 22. Now upon rotation of the rod 41, the member 47 and the view changer 22 are moved to the left, as viewed in Fig. 2, to bring the front edge 58 of the view changer into engagement with the trailing edge 59 of the foremost slide, to shift the latter out of registry with the aperture 57. When the slide 12 has thus been shifted, it passes under and is positioned behind a pair of resilient fingers 60 extending through registering slots 61 of the plate 25 and formed on the end of flat springs 62 the intermediate portions of which are secured at 63 to the rear face 64 of the plate 25, as clearly shown in Fig. 2. Continued rotation of the rod 41 will now return the member 47 and the slide changer 22 to the right so that the latter will be moved out of registry with the aperture 57. The follower 33 in the supply magazine has now been moved forward, as will be later described, to move the next slide 12 through the aperture 57 and into position on the plate 28 to be shifted by the slide changer 22 upon the next rotation of the rod 41. As the second slide is thus shifted, the leading edge 65 thereof engages the trailing edge 59 of the first slide and moves the latter into registry with the aperture 19 where it is held in place against the plate 18 by fingers 66 formed on the opposite ends of the spring 62, see Fig. 2.

Each subsequent rotation of the rod 41 thus actuates the slide changer 22 to move the foremost slide in the supply magazine 29 out of registry with the aperture 57, and to simultaneously shift the succeeding slides on the plate 28 a distance of one slide. After four such actuations, the leading edge 65 of the first slide engages the right end 67 of the plate 18, see Fig. 3, to position this first slide in registry with the discharge aperture 68 formed in the plate 18 in alignment with the take-up magazine 30, all of which is clearly shown in Fig. 3. The fifth slide has now been moved through the aperture 57 and into the path of the slide changer 22. Thus five slides are now positioned in alignment along the guide rails 24 of the mounting plate 28.

While the various slides 12 are intended to be exactly duplicates, due to manufacturing methods, they may vary slightly in size. Such variation may tend to cause a decrease or increase of the total overall length of the five slides positioned along the plate 28. Due to this overall variation, it is preferred to provide a yieldable or lost motion connection between the member 47 and the slide changer 22 so that the latter may automatically adjust itself on the plate 28 to accommodate the five slides positioned thereon. To secure this result, the pin 54 is not directly connected to the slide changer 22, but rather extends through an elongated slot 69 formed therein. A U-shaped spring 70 has the end 71 thereof secured to the offset portion 21 of the slide changer 22 while the intermediate portion 72 of the spring 70 is annular in shape and engages in a slot 73 formed on the free end of the pin 54, as best shown in Figs. 2 and 8. A supporting or resilient lost motion connection is thus provided so that the slide changer 22 may adjust itself in accordance with the length of the five slides positioned on the plate 28.

As the first slide 12 in the supply magazine 29 is shifted by the slide changer 22, the entire stack of slides in the supply magazine is moved forward to bring the next slide into position to be engaged by the slide changer upon the next actuation thereof, as is well known. In many devices now on the market, such movement of the stack of slides is secured by means of a spring connected to the follower 33 of the supply magazine. While such springs tend to urge the follower into engagement with the stack of slides, it is apparent that as the follower moves along the supply magazine, the length of, and hence the force exerted by, such a spring varies over wide limits. Furthermore there is no relation between the movement of the follower and the action of the slide shifting or changing means. To overcome this difficulty, the present invention provides an arrangement by which a constant and uniform pressure or force is applied to the follower irrespective of the position thereof, and the forward movement of the latter is controlled in timed relation to the actuation of the slide changer 22.

To this end, the threaded roll 41 has mounted thereon a similarly threaded block 76 formed with bifurcations 77 between which one end 78 of a lever 79 is positioned. A pin 80 passes through registering openings and the bifurcations 77 in the lever 79 to pivotally connect the latter to the block 76. The opposite end of the lever 79 is positioned in a slotted end 81 of a short rod 82 secured to and extending rearwardly from the follower 33 of the supply magazine 29, as best shown in Figs. 1, 2, and 7. A pin 83 passes through the slotted end 81 of the rod 82 and through a slot 84 formed on the adjacent portion of the lever 79 to pivotally connect the latter to the follower 33. By means of this arrangement, the follower 33 is operatively connected to the rod 41 which, when rotated, actuates the slide changer 22 as above described.

As the rod 41 is rotated, obviously, the block 76 will move therealong. The pitch of the threads 85 of the rod is such that the block will move forward a distance substantially equal to the thickness of one of the slides 12 upon each rotation of the rod. The block 76 thus gradually and uniformly moves along the rod during each slide changing operation. It is apparent, however, that during such operation, the slide changer 22 obstructs the aperture 57 so that the stack of slides in the supply magazine can only be moved forward at the completion of such operations or when the slide changer 22 is moved to the right, as viewed in Fig. 2. The follower thus moves in a step-by-step relation to shift the slides into position to be engaged and moved by the slide changer. In order to thus move the follower and to insure a uniform and constant pressure thereon a coil spring 86 is wrapped around the pin 80 and has one end anchored to the block 76 and the other end hooked over the lever 29, as clearly illustrated in Fig. 7. This spring thus serves to transmit the movement of the block 76 to the follower 33 to move the latter in a step-by-step relation under a constant and uniform pressure. The follower 33 is thus not only operatively connected to the slide-changer actuating means, but is also operated in proper timed relation to the movement of the slide changer. The pivotal connection between the follower 33 and the lever 79, and the similar connection between the lever and the block 76, permits axial adjustment of the follower to compensate for variations in the overall thickness of a group of slides. These pivotal connections also permit a slight variation in a number of slides used without necessitating any adjustment of the position on the block 76 on the rod 41.

As the slides successively reach the right end of the device, as viewed in Fig. 3, they are brought into registry with the discharge aperture 68. At this time five slides are now arranged in alignment along the guide rails of the mounting plate 28. It is now apparent that before another slide may be moved from the supply magazine by the slide changer, the slide in alignment with the discharge aperture 68 must first be discharged from the mounting plate 28 and into the takeup magazine 30. To this end, the present invention provides an ejector which is arranged to eject the foremost slide through the discharge aperture 68 and into the takeup magazine.

This ejector comprises, in the present embodiment, a T-shaped plate 90 which overlies the rear face 64 of the plate 25 adjacent the left end thereof, as viewed in Fig. 2. The top and bottom of the plates are bent to form flanges 91 and 92 which extend over the top and bottom edges of the plate 18 and are pivotally connected thereto by thumbscrews 93, as best shown in Fig. 2. The shank 94 of the T-shaped plate is bent to form a pair of forwardly extending ejecting lugs or pins 95 which extend through registering apertures 96 of the plate 25, see Figs. 3, 4, and 5. Now when the plate 90 is pivoted in a counterclockwise direction about its pivot 93, as viewed in Figs. 4 and 5, the pins 95 will move through the aperture 96 to engage the foremost slide to push or eject the latter out of the path of the other slides and discharge the ejected slide into the takeup magazine 30. Thus each slide is successively ejected from the mounting plate as it reaches the discharge end thereof.

Figure 4:
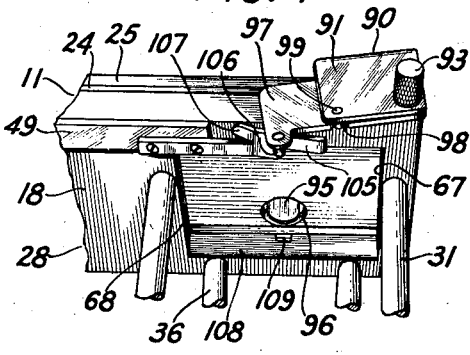
Fig. 4 is a fragmentary view of a portion of the device illustrated in Fig. 3, but on a larger scale than the latter, showing the operation of the slide ejector near the end of the ejecting operation.
Figure 5:
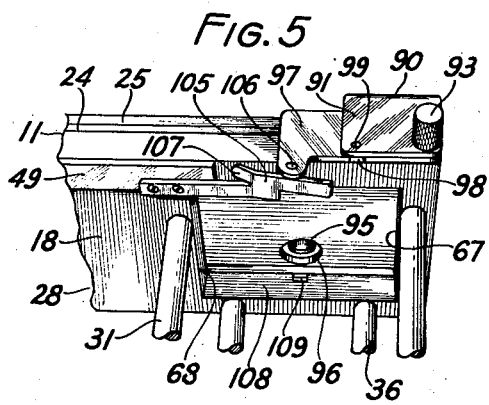
Fig. 5 is a view similar to Fig. 4, showing the position of the ejector during the forward stroke of the slide changer.
Figure 6:
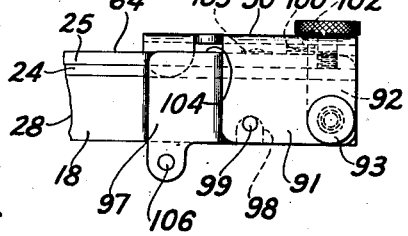
Fig. 6 is a plan view of the ejector mechanism.

The ejector plate 90 is actuated by a control plate 97 which is positioned under the flange 91 of the plate 90 and is pivoted on the top pivot screw 93, as clearly shown in Figs. 4 and 5. This control plate 97 is formed with an open end slot 98 adapted to receive a depending pin 99 carried by the flange 91, see Figs. 4, 6, and 9. A spring 100 is secured to the plate 90 and engages the rear face 64 of the plate 25, and tends to rotate the plate 90 in a clockwise direction about the pivots 93 to withdraw the ejecting pins 95 from the apertures 96 and out of the path of the slide 12. Such rotation is limited by engagement of an edge 101 of an open end slot 102 of the plate 90 with the upper thumb-screws 38, as will be apparent from an inspection of Fig. 6. A second spring 103 is secured to the back 64 of the plate 25 and engages the rear edge 104 of the plate 97 to move the latter forward to bring the base of the slot 98 into engagement with the pin 99, as illustrated in Fig. 6. The spring 103 is weaker than the spring 100, and is just strong enough to retain the plate 97 in the position shown in Fig. 6. Now when the plate 97 is rotated in a counter-clockwise direction, the pin-and-slot connections 97 and 98 carry the plate 90 as a unit therewith to eject the slide, as above described. However, when the plate 97 is rotated in a clockwise direction, the slot 98 merely moves away from the pin 99 to disconnect the control plate 97 from the ejector plate 90.

Figure 10:
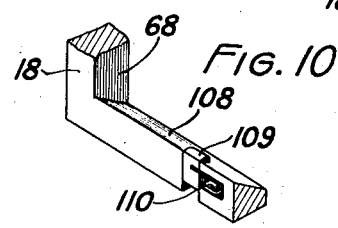
Fig. 10 is a fragmentary view of the discharge end of the device, showing the spring pressed lugs which effectively retain the ejected slides in ejected position in the takeup magazine.

While the plate 90 with its pins 95 are adapted to eject the slides, it is imperative that such ejection be in proper timed relation to the movement of the slides along the mounting plate 28. It is apparent that such ejection should not take place during the forward movement of the slide changer 22 as, at that time, the various slides are all moving along the guide rails 24. However, during the return stroke of the slide changer 22, the various aligned slides have been positioned and are stationary, and the ejection may be readily accomplished. The present invention, therefore, provides an arrangement for ejecting the foremost slide on the return stroke of the slide changer. To this end, the upper arm 49 of the U-shaped member 47 has mounted thereon a cam 105, of the shape best shown in Figs. 4 and 5. Now as the member 47 is moved to the right, as viewed in Fig. 5, during the feeding action of the slide-changer 22, the cam 105 slides over a depending pin 106 formed on the control plate 97, as shown in Fig. 5. However, on the return stroke of the member 47, a portion 107 of the cam 105 guides the pin 106 up onto the cam 105, as clearly shown in Fig. 6, to rock the control plate 97, and hence the ejector plate 90, in a counter-clockwise direction about the pivot 93. Such movement of the plate 90 actuates the pins 95 to eject the foremost slide through the discharge apertures 68 of the plate 18 and into the takeup magazine 30, as pointed out above. In order to facilitate such ejection, the lower edge of the discharge aperture 68 is tapered downward, as shown at 108, Fig. 10.

The follower 33 in the takeup magazine may be spring pressed to hold the slides 12 therein in erect position. It is desirable, however, to effectively retain the slides in their ejected position, and to prevent the slides from moving backwards through the aperture 68 and into the path of the slides aligned along the rails 24. To this end, the plate 18 is provided with a spring pressed tooth or claw 109 positioned at the bottom of the discharge aperture 68, see Fig. 10. As the slide is ejected, as above described, the slide over and depresses the tooth 109 against the action of the spring 110. However, when the slide has passed over the tooth, the latter is moved upwardly by the spring 110 and into the path of the slide to effectively retain the latter in the ejected position, the advantages of which will be readily appreciated by those in the art.

It is apparent from the above description that the slides 12 may be successively moved out of the supply magazine, into registry with the viewing aperture 19, and finally ejected or discharged into the takeup magazine 30. During the feeding operation, the slides are in motion across the aperture 19. In order to prevent such slide movement from being projected onto the viewing screen, the present invention provides a shutter 115 which is formed with an obstructing portion 116 which is arranged to be positioned in front of the lens 14 during the slide changing operation. When, however, one of the slides is in proper position in the aperture 19, the shutter is rotated to bring a cut-away portion 117 thereof into registry with the lens 14 so that the latter may project the image of the projected slide. The shutter is rotatably mounted on the shaft 118 carried by a plate 119 detachably secured to the lens plate which carries the projection lens 14.

It is obvious that the shutter may be manually rotated, but it is preferred to operatively connect this shutter to the slide-changer actuating means or rod 41 so that the shutter will be actuated in timed relation to the moving of the slide. In the present embodiment, this connection is secured by means of a shaft 120 which passes through the plate 119 and has one end slid into the collar 48 while the other end carries a sprocket 121 which is connected by a chain 122 to a similar sprocket 123 on the shutter shaft 118. The shaft 120 carries radially extending pins 124 which extend through axially extending slots 125 formed in the collar 48 to provide a spline connection between the shaft 120 and the rod 41.

It is now apparent that the rotation of the latter to actuate the slide changer 22 will also rotate the shutter 115. It is also apparent that the shutter rotation is in timed relation to the slide changing operation. The pin and slot connection 124 and 125 permit axial movement of the plate 119 and the shutter 115 with the lens 14 when the latter is adjusted for focusing. A pair of thrust collars 126 are positioned on opposite sides of the plate 119 and are secured to the shaft 120 by set screws or other simple fastening means, not shown, to maintain the shaft 120 in proper position.

It is apparent from the above description that the present invention provides a device for successively moving transparency slides into and out of projecting position. During the slide changing operation, the rotary shutter is positioned in the path of the light rays so that the movement of the slides is not visible on the screen. After the slides have been properly positioned, a previously projected slide is automatically ejected into the takeup magazine. In addition, the slide changer is resiliently mounted so that it may adjust itself to compensate for the overall length of the slides carried by the mounting plate. Also, the follower of the slide magazine is moved under a uniformly continuous pressure to feed the slides towards and into the path of the slide changer. Finally, the slides which have been ejected into the takeup magazine are positively retained in ejecting position so as not to interfere with the slide changing mechanism.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:
1. A slide changing device comprising, in combination, an apertured plate, a slide supply magazine and a slide take-up magazine secured to the opposite ends of said plate, means slidably mounted on said plate for moving said slides into and out of registry with said aperture, control means for said moving means, a slide follower mounted in and arranged for movement along said supply magazine for substantially the full length thereof, and means operatively connecting said control means to said follower to progressively move the latter along said supply magazine and toward said plate to positively feed slides in said supply magazine toward and into the path of said moving means.

2. A slide changing device comprising, in combination, an apertured plate, a slide supply magazine and a slide take-up magazine secured to the opposite ends of said plate, means slidably mounted on said plate for moving said slides into and out of registry with said aperture, control means for said moving means, a slide follower mounted in and arranged for movement along said supply magazine for substantially the full length thereof, means operatively connecting said control means to said follower to progressively move the latter along said supply magazine and toward said plate to positively feed slides in said supply magazine toward and into the path of said moving means, and resilient means engaging said connecting means for maintaining a uniform pressure on said follower as the latter moves along said supply magazine.

3. A slide changing device comprising, in combination, an apertured plate, a slide supply magazine and a slide take-up magazine secured to the opposite ends of said plate, means slidably mounted on said plate for moving said slides into and out of registry with said aperture, control means for said moving means, a slide follower in said supply magazine, means including a pivoted lever operatively connecting said control means to said follower for positively feeding the latter along said supply magazine and substantially the full length thereof to move the slides in said supply magazine toward and into the path of said moving means, said lever permitting a slight relative movement between said follower and said control means to compensate for variations in the thickness of groups of slides positioned in said supply magazine, and a spring engaging said lever to exert a constant and uniform pressure on said follower as the latter moves along said supply magazine and toward said plate to yieldably move the slides in said supply magazine toward said moving means.

4. A slide changing device comprising, in combination, an apertured plate, slide magazines secured to the opposite ends of said plate, a slide follower positioned in each of said magazines and arranged to retain slides therein in erect position, means slidably mounted on said plate for moving said slides along said plate and into and out of registry with said aperture, control means for said moving means, and a flexible connection between said control means and said moving means whereby the latter may be automatically adjusted to compensate for variations in the length of slides positioned on said plate.

5. A slide changing device comprising, in combination, an apertured plate, slide magazines secured to the opposite ends of said plate, a slide follower positioned in each of said magazines and arranged to retain slides therein in erect position, means slidably mounted on said plate for moving said slides along said plate and into and out of registry with said aperture, a member reciprocally mounted on said plate, means for resiliently connecting said moving means to said member, said connecting permitting automatic adjustment of said moving means relative to said plate to compensate for variations in the overall length of slides positioned on said plate, and actuating means for said member for controlling the movement of said moving means.

6. A slide changing device comprising, in combination, an apertured plate, slide magazines secured to the opposite ends of said plate, a slide follower positioned in each of said magazines and arranged to retain slides therein in erect position, means slidably mounted on said plate for moving said slides along said plate and into and out of registry with said aperture, a member reciprocally mounted on said plate, a pin carried by said member and extending through a slot in said plate, a spring operatively connecting said moving means and said pin, said spring providing an adjustable connection by which said moving means may be automatically adjusted relative to said plate to compensate for variations in the overall length of slides positioned on said plate, an arm pivotally connected to said member, and means for actuating said arm to operate said member and said moving means to move said slides along said plate and into and out of registry with said aperture.

7. A slide changing device comprising, in combination, an apertured plate, a slide supply and a slide take-up magazine secured to the opposite ends of said plate, a slide changer reciprocally mounted on said plate for moving said slides along said plate and into and out of registry with said aperture, control means for said changer, a flexible connection between said control means and said changer whereby the latter may move relative to said plate to automatically adjust itself to compensate for variations in the overall length of slides positioned on said plate, a slide follower mounted in said supply magazine, and means operatively connecting said control means to said follower for positively and progressively feeding the latter along said supply magazine and toward said plate for moving the slides in said supply magazine toward and into the path of said changer.

8. A slide changing device comprising, in combination, an apertured plate, a slide supply and a slide take-up magazine secured to the opposite ends of said plate, a slide changer reciprocally mounted on said plate for moving said slides along said plate and into and out of registry with said aperture, control means for said changer, a flexible connection between said control means and said changer whereby the latter may move relative to said plate to automatically adjust itself to compensate for variations in the overall length of slides positioned on said plate, a slide follower mounted in said supply magazine for movement therealong, means operatively connecting said control means to said follower for positively and progressively feeding the latter along said supply magazine and toward said plate for moving the slides in said supply magazine toward and into the path of said changer, and means for maintaining a constant and uniform pressure on said follower as the latter moves along said supply magazine.

9. A slide changing device comprising, in combination, an apertured plate, a slide supply and a slide take-up magazine secured to the opposite ends of said plate, a slide changer slidably mounted on said plate and adapted to move said slides along said plate and into and out of registry with said aperture, a member slidably mounted on said plate, means for adjustably connecting said member to said changer so as to move as a unit therewith, an ejector mounted on said plate and positioned to eject the slides from said plate and into said take-up magazine, means for moving said changer and member as a unit to shift said slides along said plate, and a cam carried by said member for actuating said ejector to eject the foremost slide on said plate into said take-up magazine.

10. A slide changing device comprising, in combination, an apertured plate, a slide supply and a slide take-up magazine secured to the opposite ends of said plate, a slide changer slidably mounted on said plate and adapted to move said slides along said plate and into and out of registry with said aperture, a member slidably mounted on said plate, a lost motion connection between said changer and said member, said connection permitting relative motion between said member and said changer so that the position of the latter may be automatically adjusted to compensate for the overall length of the slides positioned on said plate, an ejector for ejecting the slides from said plate and into said take-up magazine, means controlled by the movement of said changer for actuating said ejector, and means for moving said changer.

11. A slide changing device comprising, in combination, an apertured plate, a slide supply magazine and a slide take-up magazine secured to the opposite ends of said plate, a slide changer slidably mounted on said plate and adapted to move said slides along said plate and into and out of registry with said aperture, control means yieldably and adjustably connected to said changer for moving the latter, a slide ejector mounted on said plate and adapted to eject slides from said plate and into said take-up magazine, means controlled by the movement of said changer for actuating said ejector, and means on said take-up magazine for retaining the slides in ejected position.

12. A slide changing device comprising, in combination, an apertured plate, a slide supply magazine and a slide take-up magazine secured to the opposite ends of said plate, means slidably mounted on said plate for moving said slides into and out of registry with said aperture, a slide follower mounted in said supply magazine for movement therealong, means operatively connecting said control means to said follower for positively and intermittently feeding the latter along said supply magazine and toward said plate for moving the slides in said supply magazine toward and into the path of said moving means, an ejector for ejecting the slides from said plate and into said take-up magazine, and single control means for said moving means and said ejector.

13. A slide changing device comprising, in combination, an apertured plate, a slide supply magazine and a slide take-up magazine secured to the opposite ends of said plate, means slidably mounted on said plate for moving said slides into and out of registry with said aperture, a slide follower mounted in said supply magazine and movable therealong, means operatively connecting said control means to said follower for positively and progressively feeding the latter longitudinally along said supply magazine for moving the slides in said supply magazine toward and into the path of said moving means, an ejector for ejecting the slides from said plate and into said take-up magazine, means on said take-up magazine for retaining said slides in ejected position, and means adjustably connected to said moving means and intermittently connectable to said ejector for controlling said moving means and said ejector in proper timed relation.

14. A slide changing device comprising in combination, an apertured plate, a slide supply magazine and a slide take-up magazine secured to the opposite ends of said plate, a slide changer slidably mounted on said plate for moving said slides into and out of registry with said aperture, a member reciprocally mounted on said plate, means for yieldably connecting said changer to said member so that said changer may move relative thereto to automatically adjust itself to compensate for variations in the overall length of the slides positioned on said plate, means for actuating said member to move said changer, an ejector positioned on said plate in alignment with said take-up magazine, means on said member for operating said ejector in timed relation to the movement of said changer to eject the foremost slide on said plate into said take-up magazine, means on said take-up magazine for retaining said ejected slide in ejected position, a slide follower mounted in said supply magazine, and means for connecting said follower to said actuating means so that the latter may positively feed said follower in timed relation to the movement of said changer to move the slides in supply magazine toward and into the path of said changer.

15. A slide changing device comprising in combination with a projector having a projecting lens movable along the optical axis of said projector, a plate mounted on said projector and formed with an aperture arranged in alignment with said axis, slide supply and take-up magazine secured to the opposite ends of said plate, a slide changer slidably mounted on said plate and arranged to move said slides into and out of registry with said aperture, a rotary shutter mounted on said projector for movement with said lens, said shutter having an obstructing portion arranged to be periodically moved into said axis to cut off the light rays projected by said lens, means for actuating said changer and said shutter in proper timed relation, and an adjustable portion on said actuating means between said changer and said shutter whereby the latter may be moved along said axis as a unit with said lens.

16. A slide changing device comprising in combination with a projector having a projecting lens movable along the optical axis of said projector, a plate mounted on said projector and formed with an aperture arranged in alignment with said axis, slide supply and take-up magazines secured to the opposite ends of said plate, a slide changer slidably mounted on said plate and arranged to move said slides into and out of registry with said aperture, a rotary shutter mounted on said projector for movement with said lens, said shutter having an obstructing portion arranged to be periodically moved into said axis to cut off the light rays projected by said lens, means for actuating said changer and said shutter in proper timed relation, an adjustable portion on said actuating means between said changer and said shutter whereby the latter may be moved along said axis as a unit with said lens, a slide follower positioned in said supply magazine, and means for operatively connecting said actuating means to said follower so that the latter will be moved in proper timed sequence to the operation of said changer and said shutter to move the slides in said supply magazine toward and into the path of said changer.

17. A slide changing device comprising in combination with a projector having a projecting lens movable along the optical axis of said projector, a plate mounted on said projector and formed with an aperture arranged in alignment with said axis, slide supply and take-up magazines secured to the opposite ends of said plate, a slide changer slidably mounted on said plate and arranged to move said slides into and out of registry with said aperture, a rotary shutter mounted on said projector for movement with said lens, said shutter having an obstructing portion arranged to be periodically moved into said axis to cut off the light rays projected by said lens, means for actuating said changer and said shutter in proper timed relation, an adjustable portion on said actuating means between said changer and said shutter whereby the latter may be moved along said axis as a unit with said lens, and a yieldable connection between said actuating means and said changer whereby the latter may automatically adjust itself on said plate to compensate for the overall length of the slides positioned on said plate.

18. A slide changing device comprising in combination with a projector having a projecting lens movable along the optical axis of said projector, a plate mounted on said projector and formed with an aperture arranged in alignment with said axis, slide supply and take-up magazines secured to the opposite ends of said plate, a slide changer slidably mounted on said plate and arranged to move said slides into and out of registry with said aperture, a rotary shutter mounted on said projector for movement with said lens, said shutter having an obstructing portion arranged to be periodically moved into said axis to cut off the light rays projected by said lens, means for actuating said changer and said shutter in proper timed relation, an adjustable portion on said actuating means between said changer and said shutter whereby the latter may be moved along said axis as a unit with said lens, a slide ejector mounted on said plate and adapted to eject the slides from said plate and into said take-up magazine, and means for controlling the operation of said ejector from said actuating means and in timed relation to said changer and said shutter.

19. A slide changing device comprising in combination with a projector having a projecting lens movable along the optical axis of said projector, a plate mounted on said projector and formed with an aperture arranged in alignment with said axis, slide supply and take-up magazines secured to the opposite ends of said plate, a slide changer slidably mounted on said plate and arranged to move said slides into and out of registry with said aperture, a rotary shutter mounted on said projector for movement with said lens, said shutter having an obstructing portion arranged to be periodically moved into said axis to cut off the light rays projected by said lens, means for actuating said changer and said shutter in proper timed relation, an adjustable portion on said actuating means between said changer and said shutter whereby the latter may be moved along said axis as a unit with said lens, a slide follower positioned in said supply magazine, means for operatively connecting said actuating means to said follower so that the latter will be moved in proper timed sequence to the operation of said changer and said shutter to move the slides in said supply magazine toward and into the path of said changer, a yieldable connection between said actuating means and said changer whereby the latter may automatically adjust itself to the overall length of the slides positioned on said plate, a slide ejector mounted on said plate and adapted to eject the foremost slide on said plate into said take-up magazine, means on said control means for operating said ejector in timed relation to the movement of said changer, and means in said take-up magazine for retaining said ejected slides in ejected position.

RAYMOND W. WENGEL.